United States Patent Office 3,506,745
Patented Apr. 14, 1970

3,506,745
METHOD OF ELIMINATING PUFFING IN THE MANUFACTURE OF ELECTRODES FROM PUFFING PETROLEUM COKE
Leslie H. Juel, Lewiston, and Robert W. Rosene, Grand Island, N.Y., assignors to Great Lakes Carbon Corporation, New York, N.Y., a corporation of Delaware
No Drawing. Continuation of application Ser. No. 587,655, Oct. 19, 1966. This application May 29, 1969, Ser. No. 833,851
Int. Cl. B29b 3/00; C01b 31/02
U.S. Cl. 264—29
15 Claims

ABSTRACT OF THE DISCLOSURE

A method for producing carbon and graphite bodies, such as large graphite electrodes for use in steel producing electric furnaces, by using an aggregate comprised in part or in total of heat-treated and/or graphitized "puffing" petroleum coke which has been heated to a temperature above the puffing temperature in the presence of a puffing inhibiting agent in order to substantially eliminate puffing of the coke in the electrode when the latter is graphitized.

---

This application is a streamlined continuation application, under Commissioner's Order 824 O.G. 1, of parent application Ser. No. 587,655, filed Oct. 19, 1966, and now abandoned.

This invention relates primarily to the field of electric furnace electrodes although it also applies to the general field of manufactured carbon and graphite articles.

Under the pressure of strong competition from the basic oxygen furnace (BOF) and similar, newly developed steel making processes, the electric furnace operators have been forced to develop ways and means of reducing costs. This has been achieved largely by greatly increasing the rates of melting through the use of higher powered furnaces. As a consequence, the service demands placed upon the electric furnace electrodes has greatly increased, and electrodes having much higher current carrying capacities are now required. This alone would not be too difficult except for the fact that the thermal shock and oxidation resistance of these superconductors must also be substantially maintained if not improved.

Electrodes required for these higher powered electric furnaces are at least about 14 inches in diameter and at least about 5 feet in length and in order to get the maximum utilization from the electrodes high current densities between about 125 and about 200 amperes per square inch are employed. Modern, large-size, steel-producing electric furnaces of high productive capacity more typically require that such electrodes be about 24 inches in diameter and about 6 feet to about 9 feet in length. Such electrodes typically have threaded sockets and are coupled together by threaded nipples in order to make up the electrode column used in the electric furnace (e.g. typically about 3 electrodes in the column). The assemblage of an electrode column which will perform satisfactorily while carrying these required or desired high currents while at the same time being subjected to the severe service demands such high-powered furnaces impose has not been generally achieved in the past. Socket splitting, nipple breakage, spalling, and excessive pencilling (due to oxidation) have been quite common.

It is a finding of this invention that electrodes of high density and strength, high electrical conductivity (or low resistivity), high thermal shock resistance and low oxidation loss can best be achieved by producing the electrodes from an aggregate comprised of graphitized petroleum coke either in part or in total; or from an aggregate comprised in part or in total of a heat-treated and/or graphitized "puffing" petroleum coke which has been heated in the presence of a puffing inhibiting agent in order to inhibit its puffing. It is important that it be clearly understood that the petroleum coke which is graphitized, or which is heated sufficiently high in the presence of a puffing inhibiting agent to inhibit its puffing, is petroleum coke as such and not petroleum coke which has had its characteristics materially altered such as by procedures which are standard in the art.

It is standard practice in the production of electric furnace electrodes or other carbon and graphite bodies to use calcined (viz raw petroleum coke heated to temperatures between about 1200° C. and about 1400° C.) petroleum coke as the aggregate in the production of electrodes and to mix this aggregate with a carbonaceous binder such as pitch. The mixture typically is then formed, such as by extrusion, baked, and if desired, graphitized. If high density and high electrical conductivity are desired, these properties have typically been achieved by employing one or more pitch impregnations at some point after the initial baking operation.

It is also common practice to employ "scrap graphite" in the aggregate in the production of electrodes or other carbon and graphite bodies. "Scrap graphite" is defined as lathe turnings and other by-products from the machining of graphite products as well as any reject material generated in connection with the graphitization of articles made from calcined petroleum coke and a binder.

It will be noted that in said prior art standard practices the petroleum coke is used with another material such as pitch before the petroleum coke is heated to temperature above standard calcining temperatures. Consequently, neither of the foregoing standard prior art practices employ petroleum coke in the same manner as it is employed and as described herein. By using petroleum coke, processed as described herein, either alone or in part in the aggregate, carbon and graphite articles of high density and electrical conductivity can be achieved without loss in thermal shock resistance.

It is known that most petroleum cokes, especially those of the so-called needle type as defined in the Shea patent (U.S. 2,775,549), undergo "puffing" or expansion when heated to temperatures above at least about 1400° C., such as when, for example, they are heated through the temperature range of about 1400 to 1800° C., as of course is the case if they are heated to 2000° C. and higher. This puffing does not occur during normal calcining or baking operations. If this puffing is not inhibited or prevented, the petroleum coke when heated to such temperatures as indicated will possess a low bulk density. If this occurs many of the advantages of using this type of aggregate are lost and the properties sought in the baked and/or graphitized electrodes to be produced will not be achieved. This results primarily from the fact that the low bulk density material requires excessive amounts of binder to form a suitable mix for forming, and even if such a mix is formed by extrusion or molding, subsequent processing is difficult, and also a low density, low strength product typically results.

To eliminate or substantially reduce this puffing, it is a finding of this invention that those puffing inhibitors or puffing inhibiting agents normally added to the mix formulation to inhibit puffing of an article to be baked and/or graphitized can be admixed with the granular petroleum coke itself prior to or during the heating to the puffing and higher temperatures; and that employing the puffing inhibiting agent(s) in this manner, in contrast to inhibiting the puffing of the formed articles made from the petroleum coke, leads to several processing and product advantages over the latter prior art technique of using puffing inhibiting agent(s). If the inhibiting agent is introduced during the heating of the granular petroleum coke, the time of introduction must be such that the temperature is still below the point where puffing begins.

The "granular petroleum coke" being discussed is solid petroleum coke which results from the thermal cracking and polymerization of heavy petroleum residues such as reduced or top crudes, thermally or catalytically cracked residuums, etc. The coking is normally conducted in a vertical cylindrical drum such as those manufactured by Kellogg, Lummus and Foster Wheeler Companies. The heavy hydrocarbons are admitted into the drum at a temperature between 875° and 950° F., and are permitted to soak and carbonize until the drum is nearly filled with a solid coke. The material is removed from the drum by various decoking methods known to the art. The material removed from the coking drum will vary widely in particle size. Generally, however, at least about 40–50% of it will be retained on a one-quarter inch screen. The granular petroleum coke may be either the "raw" coke, viz the coke as it is removed from the coking drum and which typically has a volatile matter (VM) content of about 8 to about 20%, or it may be calcined petroleum coke, viz raw petroleum coke which has been heated to no higher than about 1400° C. and to a VM content of less than about 1%.

The volatile matter being discussed here is determined by ASTM method D271–48 modified for "sparking fuels" and is exclusive of the moisture and free oil which would be removed by heating to temperatures of 400–500° F. Volatile matter is determined in a platinum crucible in an electrically heated furnace maintained at temperatures of 1742° F.±36° F. A one gram sample of dry −60 mesh coke is preheated at temperatures below 1742° F. and then kept at a temperature of 1742° F.±36° F. for six minutes and the resulting weight-loss is termed volatile matter. In any case, the petroleum coke itself is subjected to the process steps described herein, rather than petroleum coke after it has been mixed with a binder and then formed, prior to being baked and/or graphitized, etc.

The techniques for contacting the puffing inhibitor with the puffing petroleum coke to be heated or graphitized are manifold. Dusting, spraying, mechanical mixing, and impregnating may all be used. Typically the inhibiting agent will be used in the form of a fine powder, e.g. substantially all minus 200 mesh, and can be dusted on the coarser petroleum coke. If spraying is to be used, a slurry composed of one part of inhibiting agent (e.g. iron oxide) to two parts water can be prepared and then sprayed on the coke using about 1.1 parts by weight of iron oxide for each 100 parts of coke. If impregnation is employed, inhibiting agents in solution can be used. If mechanical mixing is employed, any mechanical mixer which will bring about substantially uniform and intimate blending of the inhibiting agent with the coke in the desired proportions can be used.

The amount of inhibitor required in any of the "contacting" procedures such as just discussed will depend upon the magnitude of the puffing exhibited by the coke, but will seldom exceed about 3% by weight of the coke, and will typically be used in such an amount as to entirely or at least substantially eliminate the puffing of the petroleum coke.

The puffing petroleum coke which has been contacted with the puffing inhibiting agent may be heated in several ways, for example, by conductive heating in a graphite tube furnace or by resistive heating in a suitable "graphitizing" furnace. In either of these heating techniques the puffing inhibiting agent can be admixed with the granular petroleum coke prior to or during the heating of the petroleum coke. In any case the mixture of the puffing petroleum coke and puffing inhibiting agent is heated in a substantially non-oxidizing atmosphere to a temperature above that at which the coke begins to puff in the absence of said puffing inhibiting agent, and preferably to a temperature at least as high as 2000° C. Preferably the mixture will be heated to a temperature between about 2000° C. and about 3000° C., and, in some instances, at very rapid upheat rates such as up to about 10,000° C. per hour.

After being so heated, the puffing petroleum coke is typically cooled to room temperature and in any case to a temperature below about 200° C. so that it can be conveniently handled in the next steps of the process. These next steps comprise mixing the aforesaid cooled product with a carbonaceous binder such as pitch, forming this petroleum coke-binder product into an article of desired configuration and heating the formed article under non-oxidizing conditions to a temperature at least sufficiently high to carbonize the binder (for example, at least to about 500–600° C.). Where the article is to be "graphitized," it is subjected to a temperature at least as high as about 2000° C.

Typically other carbon materials can be used as aggregate and mixed with the aforesaid cooled product and binder in making the formed article, but in any event the cooled product will comprise at least 20% by weight of the aggregate or carbon filler used in making the formed article in order that the processing and product advantages of the present invention may be achieved to a substantial degree. Preferably the cooled product will be used in such an amount as to comprise at least 50% by weight of the aggregate which is mixed with the carbonaceous binder.

Because part or all of the carbon filler used in making the formed article has been heated to a very high temperature, e.g. higher than conventional calcining or baking temperatures and at least to a temperature above that at which the petroleum coke begins to puff, and preferably above 2000° C., the carbon article or body produced when it is heated "to a temperature sufficient to carbonize the binder" can also be referred as to a "semi-graphite" carbon body. The article or body produced when the formed article is heated "to a temperature at least as high as about 2000° C." is referred to herein as a "graphite" body.

If the article is heated "to a temperature at least as high as about 2000° C.," the heating of same will typically be carried out in separate baking and graphitizing operations. Separate furnaces and intermediate cooling between the baking and graphitizing will also generally be employed in such a process variation.

It will frequently be desirable to impregnate the carbon body with a carbonaceous binder after it is baked and before it is graphitized.

The aforedescribed cooled product or carbon aggregate which is made from a puffing petroleum coke and which is employed in amounts sufficient to comprise at least 20% by weight of the aggregate or carbon filler used in making the formed article is considered unique with the present invention as are also the process techniques described for making same.

Even if the petroleum coke used to make carbon and/or graphitized articles is a "non-puffing" petroleum coke it has been found highly advantageous to process such coke in a manner similar to the foregoing, except that no puffing inhibiting agent need be used. In other words, it has been found highly advantageous to "pre-graphitize" such a petroleum coke, by heating the coke in a substantially non-oxidizing atmosphere to a temperature at least as high as 2000° C., such as to a temperature between 2000° C. and 3000° C., before mixing the coke with a carbonaceous binder and processing it in the usual manner. Such "pre-graphitized" coke is then cooled to 200° C. and typically lower such as to room temperature and employed in amounts so as to comprise at least 20% by weight of the aggregate in the production of carbon or graphite bodies.

It should also be pointed out that at least some of the "pre-graphitized" petroleum coke which is used in the aggregate has a rather coarse particle size, e.g. greater than 35 mesh (Tyler screen series) and smaller than ½ inch; if larger size articles are to be produced, even coarser particles, e.g. greater than 6 mesh and smaller than ¾ inch may be used. The balance, if any, of the carbon filler or aggregate used can be any suitable material such as "pre-graphitized" coke which is finer than the foregoing, or sized "graphite scrap" or calcined petroleum coke flour, etc., the term "flour" being used to designate a carbon filler typically having a particle size of about 50% minus 200 mesh and substantially 100% minus 35 mesh. Preferably the "pre-graphitized" coke will comprise between 20% and about 70% of the carbon filler or aggregate used, but may comprise up to 100% of same.

As previously pointed out, the processing techniques of the present invention are particularly advantageous in the production of electrodes for modern, large-size, steel-producing, electric furnaces of high productive capacity wherein the electrodes have to be of substantial dimension as previously described and wherein they are subjected to high current densities in excess of about 125 amperes per square inch. These techniques have minimized processing losses, enabled greater product uniformity, and reduced processing times and costs and have also resulted in electrodes of improved thermal shock resistance at high levels of density, strength and electrical conductivity. Large graphite electrodes, which have been made for use on a steel furnace as just described, and which have been made by using puffing petroleum coke whose puffing has been inhibited by the techniques described herein, or pre-graphitized petroleum coke as described herein, have been found to be particularly important and valuable articles of commerce, and novel with the present invention because of the manner in which they have been made, the outstanding properties that they possess, and because of their pre-eminently satisfactory performance in this particular use environment.

The following examples are illustrative of the improvements attainable through the practice of this invention.

EXAMPLE 1

A needle type calcined petroleum coke (all minus 1 inch and determined in advance to be a puffing coke) was heated to 2900° C. in the presence of 1½% by weight of finely divided iron oxide powder. The coke was contacted witht the iron oxide by the aforedescribed "spraying" technique. The heating was conducted over a period of about 8 hours in a neutral or non-oxidizing atmosphere. After cooling, the graphitized coke was crushed and sized to give a particle fraction (minus 4 plus 35 mesh Tyler) and a flour fraction (50% minus 200 mesh Tyler). Sixty (60) parts of the particles and 40 parts of the flour were mixed in a steam jacketed mixer with 35 parts of coal tar pitch binder and extruded into 20 inch diameter electrodes. After baking and then graphitizing to 2700° C., the physical properties of the electrodes were measured. The results are tabulated below. For comparison, a similar mix was prepared from the same original calcined coke using the same particle and flour sizings and the same amount of iron oxide powder and was processed along with the above electrodes. The calcined petroleum coke was not "pre-graphitized" before being mixed with the binder, and extruded, baked and graphitized. The physical properties of these electrodes after graphitization to 2700° C. were also measured and are tabulated below.

| Physical properties | Type of carbonaceous aggregate or filler | |
|---|---|---|
| | Calcined petroleum coke | "Pre-graphitized" petroleum coke |
| Apparent density, A.D., g./cc | 1.56 | 1.56 |
| Resistivity, Res., ohm-in.×10⁵ | 37.9 | 35.7 |
| Modulus of rupture, M.O.R., p.s.i. | 1,020 | 980 |
| Coefficient of thermal expansion, C.T.E., °C.⁻¹×10⁷ | 7.3 | 3.8 |

The dramatic reduction in C.T.E., which indicates a corresponding reduction in susceptibility to thermal shock is of primary significance.

EXAMPLE 2

Using the same formulations as in Example 1, extruded electrodes made from calcined coke and from "pre-graphitized" coke were baked and then pitch impregnated in the standard manner to increase density and strength. After graphitizing these electrodes, their physical properties were measured. The results are tabulated below.

| Physical properties | Type of aggregate or filler | |
|---|---|---|
| | Calcined petroleum coke | "Pre-graphitized" petroleum coke |
| A.D., g./cc | 1.68 | 1.67 |
| Res., ohm-in.×10⁵ | 25.7 | 25.9 |
| M.O.R., p.s.i. | 1,870 | 1,780 |
| C.T.E., °C.⁻¹×10⁷ | 9.7 | 4.1 |

Again, the drastic or dramatic reduction in C.T.E. obtained by using the "pre-graphitized" coke represents a corresponding improvement in thermal shock resistance.

EXAMPLE 3

Using the procedure of Example 1, but employing a blend of 60% pre-graphitized coke particles and 40% calcined coke flour in the aggregate, a mix was prepared from 100 parts aggregate and 29 parts of coal tar pitch binder. The extruded electrodes were baked and pitch impregnated before final graphitization. The following table compares the physical properties of graphitized electrodes similarly processed from 100% calcined coke.

| Physical properties | Type of aggregate or filler | |
|---|---|---|
| | 100% calcined petroleum coke | 60% pre-graphitized petroleum coke, 40% calcined petroelum coke |
| A.D., g./cc | 1.71 | 1.70 |
| Res., ohm-in.×10⁵ | 27 | 22 |
| M.O.R., p.s.i. | 2,065 | 2,272 |
| C.T.E., °C.⁻¹×10⁷ | 12.6 | 7.6 |

Again, the improvement in C.T.E. attributed to the use of the pre-graphitized aggregate is vividly demonstrated.

EXAMPLE 4

Using the procedure of Example 1, but employing a blend of 40% pre-graphitized coke and 60% calcined coke in the aggregate, a mix was prepared from 100 parts of this aggregate (all passing a 10 mesh Tyler standard sieve) and 36 parts by weight coal tar pitch binder. Following baking, the extruded electrodes were pitch impregnated and graphitized. In the table below the physical properties of the graphitized electrodes are compared with those of an equivalent set made from 100% calcined coke aggregate.

| Physical properties | Type of aggregate or filler | |
|---|---|---|
| | 100% calcined petroleum coke | 40% pre-graphitized petroleum coke, 60% calcined petroleum coke |
| A.D., g./cc | 1.77 | 1.74 |
| Res., ohm-in.×10⁵ | 20 | 20 |
| M.O.R., p.s.i. | 2,726 | 2,912 |
| C.T.E., °C.⁻¹×10⁷ | 8.2 | 6.6 |

The improvement in thermal shock characteristics attributable to the pre-graphitized coke is clearly evidenced by the substantial reduction in C.T.E.

The foregoing examples all illustrate the processing of "puffing" petroleum cokes, the techniques of using same in accordance with the teachings of the present invention, and the advantages of same as compared to standard prior art techniques which are used in making graphite articles from puffing petroleum coke.

The following examples demonstrate the advantages of proceeding in accordance with the teachings of the present invention when using "non-puffing" petroleum cokes.

EXAMPLE 5

A calcined petroleum coke (all minus 1 inch), which had been determined in advance to be a "non-puffing" petroleum coke, was heated to 2900° C. The heating was conducted over a period of about 8 hours in a neutral or non-oxidizing atmosphere. After cooling, the graphitized coke was crushed and sized to give a particle fraction (minus 4 plus 35 mesh) and a flour fraction (50% minus 200 mesh). Sixty (60) parts of the particles and 40 parts of the flour were mixed in a steam jacketed mixer with 35 parts of coal tar pitch binder and extruded into 14 inch diameter electrodes. After baking and then graphitizing to 2700° C., the physical properties of the electrodes were measured. The results are tabulated below. For comparison, a similar mix was prepared from the same original calcined coke using the same particle and flour sizings and was processed along with the above electrodes. The calcined petroleum coke was not "pre-graphitized" before being mixed with the binder, and extruded, baked and graphitized. The physical properties of these electrodes after graphitization to 2700° C. were also measured and are tabulated below.

| Physical properties | Type of aggregate or filler | |
|---|---|---|
| | Calcined petroleum coke | "Pre-graphitized" petroleum coke |
| A.D., g./cc | 1.60 | 1.60 |
| Res., ohm-in.×10⁵ | 36 | 35 |
| M.O.R., p.s.i. | 1,200 | 1,100 |
| C.T.E., ° C.⁻¹×10⁷ | 12.0 | 7.0 |

The advantage of "pre-graphitizing" the petroleum coke is illustrated by the substantial reduction in C.T.E. which signifies a corresponding improvement in thermal shock resistance.

EXAMPLE 6

Using the same formulations as in Example 5, extruded electrodes of the same size as in Example 5 made from calcined coke and from "pre-graphitized" coke were baked and then pitch impregnated in the standard manner to increase density and strength. After graphitizing these electrodes, their physical properties were measured. The results are tabulated below.

| Physical properties | Type of aggregate or filler | |
|---|---|---|
| | Calcined petroleum coke | "Pre-Graphitized" petroleum coke |
| A.D., g./cc | 1.68 | 1.67 |
| Res., ohm-in.×10⁵ | 28.0 | 27.5 |
| M.O.R., p.s.i. | 1,900 | 1,850 |
| C.T.E., ° C.⁻¹×10⁷ | 16 | 10 |

Again the improvement obtainable by "pre-graphitizing" the petroleum coke is clearly illustrated.

EXAMPLE 7

Raw petroleum coke having a volatile matter (VM) content of about 8% (all minus 1 inch), and which had been determined in advance to be a "puffing" petroleum coke, was heated to 2500° C. in the presence of 1½% by weight of finely divided iron oxide powder. The coke was contacted with the iron oxide by the aforedescribed "spraying" technique. The heating was conducted over a period of about 11 hours in a neutral or non-oxidizing atmosphere. After cooling, the graphitized coke was crushed and sized to give a particle fraction (minus 4 plus 35 mesh) and a flour fraction (50% minus 200 mesh). Sixty (60) parts of the particles and 40 parts of the flour were mixed in a steam jacketed mixer with 35 parts of coal tar pitch binder and extruded into 14 inch diameter electrodes. After baking and then graphitizing to 2700° C., the physical properties of the electrodes were measured. For comparison, electrodes were made from a similar mix of aggregate, iron oxide powder and coal tar pitch binder in which the aggregate was prepared by first calcining the same original raw petroleum coke to a temperature of about 1250° C. in a rotary kiln, cooling the calcined coke, and then crushing and milling to give the same particle and flour sizings as above. These electrodes were processed along with the above. The physical properties of these electrodes after graphitization to 2700° C. are tabulated below.

| Physical properties | Type of aggregate or filler | |
|---|---|---|
| | Calcined raw coke | "Pre-graphitized" raw petroleum coke |
| A.D., g./cc | 1.56 | 1.58 |
| Res., ohm-in.×10⁵ | 37.9 | 36.0 |
| M.O.R., p.s.i. | 1,020 | 900 |
| C.T.E., ° C.⁻¹×10⁷ | 7.3 | 3.7 |

This example illustrates that the processing techniques of this invention may be applied to raw petroleum coke as well as to calcined petroleum coke in achieving the improvements described herein.

The inhibition of the puffing of formed articles made from puffing petroleum coke, previously referred to as a standard prior art procedure, is described, for example, in U.S. Patent 2,814,076, wherein several chemicals used to inhibit puffing are discussed. The particular puffing inhibiting agent(s) employed in the process of the present invention is not considered to be of any patentable significance, although iron oxide is considered as the preferred inhibiting agent. However, the manner in which the inhibitor is employed in the process of the present invention, as described herein and as contrasted with prior art techniques of employing puffing inhibitors, and the improvements achievable thereby, are considered of patentable significance.

Also, the technique of determining whether a petroleum coke "puffs" is no part of the present invention. However, the following explanation of a general or typical procedure employed in making this determination is set forth so that what is meant by this phenomenon will be clarified.

A given portion of the petroleum coke to be tested for "puffing" is calcined. Plugs are made from the calcined coke, using a particle mix, baked to 1000° C. and carefully measured before and periodically during the graphitizing cycle for indications of abnormal thermal expansion, commonly referred to as puffing. If puffing is indicated, various amounts of puffing inhibitor are added to the mix from which the plugs are made, and the heating process repeated. The amount of inhibiting agent required to eliminate puffing is therefore taken as that amount required to eliminate this abnormal expansion.

As previously pointed out, some petroleum cokes do not "puff" when tested in the foregoing manner, although most do, and if this is the case, then the use of a puffing inhibiting agent is not required and all that is necessary is to heat the petroleum coke, to a temperature in excess of about 2000° C., in a manner as described herein, in order to prepare the carbon and graphite articles as described herein.

It is to be understood that the invention is not limited to the specific examples which have been offered merely as illustrative and that modifications may be made within the scope of the appended claims without departing from the spirit of the invention.

We claim:

1. A process for producing a carbon body from a puffing petroleum coke which consists in:
  (A) contacting puffing petroleum coke having a particle size of minus 1 inch with a non-gaseous puffing inhibiting agent in a sufficient amount to substantially eliminate puffing of the petroleum coke;

(B) heating the mixture of step (A) in a non-oxidizing atmosphere to a temperature above about 1400° C. and also above that at which the coke begins to puff in the absence of said puffing inhibiting agent;

(C) cooling the product of step (B) to a temperature below about 200° C.;

(D) mixing carbon filler comprised of at least 20% by weight of the cooled product of step (C) with a pitch binder;

(E) forming the product of step (D) into an article of desired configuration; and (F) heating the formed article of step (E) under non-oxidizing conditions to a temperature above about 500° C. and sufficiently high to carbonize the binder.

2. A process for producing a carbon body from a puffing petroleum coke which consists in:

(A) contacting puffing petroleum coke having a particle size of minus 1 inch, with a non-gaseous puffing inhibiting agent in a sufficient amount to substantially eliminate puffing of the petroleum coke;

(B) heating the mixture of step (A) in a non-oxidizing atmosphere to a temperature at least as high as 2000° C.;

(C) cooling the product of step (B) to a temperature below about 200° C.;

(D) mixing carbon filler comprised of at least 20% by weight of the cooled product of step (C) with a pitch binder;

(E) forming the product of step (D) into an article of desired configuration; and (F) heating the formed article of step (E) under non-oxidizing conditions to a temperature above about 500° C. and sufficiently high to carbonize the binder.

3. A process according to claim 2 wherein the mixture of step (A) is heated in step (B) to a temperature between about 2000° C. and about 3000° C. employing a maximum upheat rate of about 10,000° C. per hour.

4. A process according to claim 2 wherein the cooled product from step (C) comprises at least 50% by weight of the carbon filler which is mixed with a pitch binder in step (D).

5. A process according to claim 2 wherein the formed article is heated in step (F) to a temperature between about 800° C. and about 1000° C.

6. A process according to claim 2 wherein the heat-treated carbon article of step (F) is impregnated with a carbonaceous binder.

7. A process for producing a graphite body from a puffing petroleum coke which consists in:

(A) contacting puffing petroleum coke having a particle size of minus 1 inch, with a non-gaseous puffing inhibiting agent in a sufficient amount to substantially eliminate puffing of the petroleum coke;

(B) heating the mixture of step (A) in a non-oxidizing atmosphere to a temperature above about 1400° C. and also above that at which the coke begins to puff in the absence of said puffing inhibiting agent;

(C) cooling the product of step (B) to a temperature below about 200° C.;

(D) mixing carbon filler comprised of at least 20% by weight of the cooled product of step (C) with a pitch binder;

(E) forming the product of step (D) into an article of desired configuration; and (F) heating the formed article of step (E) under non-oxidizing conditions to a temperature at least as high as about 2000° C.

8. A process for producing a graphite body from a puffing petroleum coke which consists in:

(A) contacting puffing petroleum coke having a particle size of minus 1 inch, with a non-gaseous puffing inhibiting agent in a sufficient amount to substantially eliminate puffing of the petroleum coke;

(B) heating the mixture of step (A) in a non-oxidizing atmosphere to a temperature at least as high as 2000° C.;

(C) cooling the product of step (B) to a temperature below about 200° C.;

(D) mixing carbon filler comprised of at least 20% by weight of the cooled product of step (C) with a pitch binder;

(E) forming the product of step (D) into an article of desired configuration; and (F) heating the formed article of step (E) under non-oxidizing conditions to a temperature at least as high as about 2000° C.

9. A process according to claim 8 wherein heating step (F) is carried out in separate baking and graphitizing operations.

10. A process according to claim 8 wherein the mixture of step A is heated in step (B) to a temperature between about 2000° C. and about 3000° C. employing a maximum upheat rate of about 10,000° C. per hour.

11. A process according to claim 8 wherein the cooled product from step (C) comprises at least 50% by weight of the carbon filler which is mixed with a pitch binder in step (D).

12. A process according to claim 9 wherein the formed article is heated in step (F) to a baking temperature between about 800° C. and about 1000° C., and wherein the baked article is heated to a graphitizing temperature between about 2000° C. and about 3000° C.

13. A process according to claim 9 wherein the baked carbon article is impregnated with a carbonaceous binder before being subjected to the graphitizing operation.

14. A process for producing a cylindrical graphite body from a puffing petroleum coke, said graphite body having a minimum diameter of about 14 inches and a minimum length of about 5 feet to be used in an electric furnace for the production of steel, which consists in:

(A) contacting puffing petroleum coke having a particle size of minus 1 inch, with a non-gaseous puffing inhibiting agent in a sufficient amount to substantially eliminate puffing of the petroleum coke;

(B) heating the mixture of step (A) in a non-oxidizing atmosphere to a temperature above about 1400° C. and also above that at which the coke begins to puff in the absence of said puffing inhibiting agent;

(C) cooling the product of step (B) to a temperature below about 200° C.;

(D) mixing carbon filler comprised of at least 20° by weight of the cooled product of step (C) with a pitch binder;

(E) forming the product of step (D) into a cylindrical body of the desired dimensions; and (F) heating the formed article of step (E) under non-oxidizing conditions to a temperature at least as high as about 2000° C.

15. A process for producing a cylindrical graphite body from a puffing petroleum coke, said graphite body having a minimum diameter of about 14 inches and a minimum length of about 5 feet to be used in an electric furnace for the production of steel, which consists in:

(A) contacting puffing petroleum coke having a particle size of minus 1 inch, with a non-gaseous puffing inhibiting agent in a sufficient amount to substantially eliminate puffing of the petroleum coke;

(B) heating the mixture of step (A) in a non-oxidizing atmosphere to a temperature at least as high as 2000° C.;

(C) cooling the product of step (B) to a temperature below about 200° C.;

(D) mixing carbon filler comprised of at least 20° by weight of the cooled product of step (C) with a pitch binder;

(E) forming the product of step (D) into a cylindrical body of the desired dimensions; and (F) heating the formed article of step (E) under non-oxidizing conditions to a temperature at least as high as about 2000° C.

References Cited

UNITED STATES PATENTS

| | | | |
|---|---|---|---|
| 2,522,766 | 9/1950 | Swallen et al. | 18—55 |
| 2,814,076 | 11/1957 | Gartland | 18—54.7 |
| 3,158,566 | 11/1964 | Tyson | 208—127 |
| 3,321,327 | 5/1967 | Blanchard | 117—46 |
| 3,338,993 | 8/1967 | Juel et al. | 264—29 |
| 3,369,871 | 2/1968 | Hardy et al. | 23—209.9 |

FOREIGN PATENTS 664,517   6/1963   Canada.

JULIUS FROME, Primary Examiner

J. H. MILLER, Assistant Examiner

U.S. Cl. X.R.

23—209.1, 209.9; 201—9, 17, 20; 264—105